United States Patent
Cerri et al.

(10) Patent No.: US 10,090,531 B2
(45) Date of Patent: Oct. 2, 2018

(54) VERTICALLY ALIGNED TITANIUM OXIDE NANOTUBES FOR FUEL CELL ELECTRODES

(71) Applicant: TOYOTA MOTOR EUROPE NV/SA, Brussels (BE)

(72) Inventors: Isotta Cerri, Steenokkerzeel (BE); Julien Roussel, Brussels (BE)

(73) Assignee: TOYOTO MOTOR EUROPE NV/SA, Brussels (BE)

( * ) Notice: Subject to any disclaimer, the term of this patent is extended or adjusted under 35 U.S.C. 154(b) by 164 days.

(21) Appl. No.: 14/770,683

(22) PCT Filed: Feb. 26, 2013

(86) PCT No.: PCT/EP2013/053805
§ 371 (c)(1),
(2) Date: Aug. 26, 2015

(87) PCT Pub. No.: WO2014/131432
PCT Pub. Date: Sep. 4, 2014

(65) Prior Publication Data
US 2015/0364769 A1    Dec. 17, 2015

(51) Int. Cl.
*H01M 4/86* (2006.01)
*H01M 4/88* (2006.01)
(Continued)

(52) U.S. Cl.
CPC ........... *H01M 4/8657* (2013.01); *B29C 65/02* (2013.01); *B29C 66/72* (2013.01);
(Continued)

(58) Field of Classification Search
CPC ............. H01M 4/8657; H01M 4/9016; H01M 4/8882; H01M 4/8896; H01M 4/8673;
(Continued)

(56) References Cited

U.S. PATENT DOCUMENTS 4,389,973 A    6/1983  Suntola et al.
7,179,561 B2   2/2007  Niu et al.
(Continued)

FOREIGN PATENT DOCUMENTS

CN    101537350 A    9/2009
CN    101560669 A    10/2009
(Continued)

OTHER PUBLICATIONS

Yang, Chun-Chen, Wen-Chen Chien, and Yingjeng James Li. "Direct methanol fuel cell based on poly (vinyl alcohol)/titanium oxide nanotubes/poly (styrene sulfonic acid)(PVA/nt-TiO2/PSSA) composite polymer membrane." Journal of Power Sources 195.11 (2010): 3407-3415.*
(Continued)

*Primary Examiner* — Nicholas P D'Aniello
*Assistant Examiner* — Philip A. Stuckey
(74) *Attorney, Agent, or Firm* — Oliff PLC (57) ABSTRACT

The present invention relates to a structure including a layer including titanium (di)oxide nanostructures, such as titania nanotubes, in contact with a membrane layer including a proton-conducting polymer. A process for preparing the structures of the invention is presented wherein titanium (di)oxide nanostructures on a first substrate are transferred to an ion-conducting polymer membrane by pressing using a hot press, and then detaching the nanostructures from the first substrate.

13 Claims, 5 Drawing Sheets

(51) Int. Cl.
| | |
|---|---|
| H01M 4/92 | (2006.01) |
| B29C 65/02 | (2006.01) |
| B29C 65/00 | (2006.01) |
| H01M 4/90 | (2006.01) |
| B29L 31/34 | (2006.01) |

(52) U.S. Cl.
CPC .... *B29C 66/73141* (2013.01); *B29C 66/7428* (2013.01); *H01M 4/8673* (2013.01); *H01M 4/881* (2013.01); *H01M 4/8814* (2013.01); *H01M 4/8882* (2013.01); *H01M 4/8896* (2013.01); *H01M 4/9016* (2013.01); *H01M 4/925* (2013.01); *B29L 2031/3468* (2013.01)

(58) Field of Classification Search
CPC .... H01M 4/925; H01M 4/881; H01M 4/8814; B29C 66/73141; B29C 66/7428; B29C 66/72; B29C 65/02; B29L 2031/3468
See application file for complete search history.

(56) References Cited

U.S. PATENT DOCUMENTS

| | | | |
|---|---|---|---|
| 7,622,217 B2 | 11/2009 | Debe et al. | |
| 2008/0014505 A1* | 1/2008 | Kato | F03G 7/005 |
| | | | 429/246 |
| 2010/0258446 A1 | 10/2010 | Mohapatra et al. | |
| 2011/0008707 A1 | 1/2011 | Muraoka et al. | |
| 2012/0077672 A1 | 3/2012 | Chu et al. | |
| 2013/0032269 A1 | 2/2013 | Liu et al. | |

FOREIGN PATENT DOCUMENTS

| | | |
|---|---|---|
| CN | 102916199 A | 2/2013 |
| JP | 2007-048573 A | 2/2007 |
| JP | 2008-523565 A | 7/2008 |
| JP | 2010-173862 A | 8/2010 |
| JP | 2010-262928 A | 11/2010 |
| WO | 02/061871 A2 | 8/2002 |
| WO | 2010/080703 A2 | 7/2010 |

OTHER PUBLICATIONS

Zhang, Changkun, et al. "Supported Noble Metals on Hydrogen-Treated TiO2 Nanotube Arrays as Highly Ordered Electrodes for Fuel Cells." ChemSusChem 6.4 (2013): 659-666. (Year: 2013).*
Zhang, Changkun, et al. "An oriented ultrathin catalyst layer derived from high conductive TiO2 nanotube for polymer electrolyte membrane fuel cell." Electrochimica Acta 153 (2015): 361-369. (Year: 2014).*
Oct. 29, 2013 Search Report issued in International Patent Application No. PCT/EP2013/053805.
Rajalakshmi, N. et al, "Nano titanium oxide catalyst support for proton exchange membrane fuel cells", International Journal of Hydrogen Energy, Dec. 1, 2008, vol. 33, No. 24, pp. 7521-7526.
Bauer, Alex et al., "Pt nanoparticles deposited on TiO2 based nanofibers: Electrochemical stability and oxygen reduction activity", Journal of Power Sources, May 15, 2010, vol. 195, No. 10, pp. 3105-3110.
Zwilling, V. et al., "Anodic oxidation of titanium and TA6V alloy in chromic media. An electrochemical approach," Electrochimica Acta, 1999, vol. 45, pp. 921-929.
Paramasivam, I. et al., "Electrochemical synthesis of self-organized TiO2 nanotubular structures using an ionic liquid (BMIM-BF4)", Electrochimica Acta, 2008, vol. 54, pp. 643-648.
Lin, Hsiao-Wei et al., "Facile Fabrication of TiO2 Nanorod Arrays for Gas Sensing using Double-Layered Anodic Oxidation Method", Journal of The Electrochemical Society, 2012, vol. 159 (1), pp. K5-K9.
Beh, K.P. et al., "Fabrication of titanium dioxide nanofibers via anodic oxidation", Applied Surface Science, 2011, vol. 257, pp. 4706-4708.
Liu, Jun et al., "Double-Shelled Nanocapsules of V2O5-Based Composites as High-Performance Anode and Cathode Materials for Li Ion Batteries", J. Am. Chem. Soc., 2009, vol. 131, pp. 12086-12087.
Maiyalagan T. et al., "Fabrication and characterization of uniform TiO2 nanotube arrays by sol-gel template method", Bull. Mater. Sci., Dec. 2006, vol. 29, No. 7, pp. 705-708.
Lashdaf, M. et al., "Platinum catalysts on alumina and silica prepared by gas- and liquid-phase deposition in cinnamaldehyde hydrogenation", Applied Catalysis A: General, 2004, vol. 276, pp. 129-137.

* cited by examiner

VERTICALLY ALIGNED TITANIUM OXIDE NANOTUBES FOR FUEL CELL ELECTRODES

The present invention relates to structures comprising presentations of titanium oxide nanostructures, such as nanotubes, on a polymer membrane, and also to methods for producing such structures. The structures of the invention may be useful for polymer electrode membrane (PEM) fuel cell electrodes (either at the cathode or the anode), and may also be useful supports for other electrochemical or catalytic devices, such as batteries, solar cells, and sensors.

BACKGROUND TO THE INVENTION

In typical low temperature fuel cells, of considerable interest in the automotive field, hydrogen ($H_2$), or an organic material with high hydrogen content, supplied to the anode, is oxidized with the release of electrons, whilst at the cathode, oxygen ($O_2$) is reduced. Platinum (Pt) is a highly active material acting as a catalyst in such fuel cells, and can be used at both the cathode and anode. At the cathode, platinum catalysts are commonly employed to assist in the oxygen reduction reaction (ORR).

Figure 1:
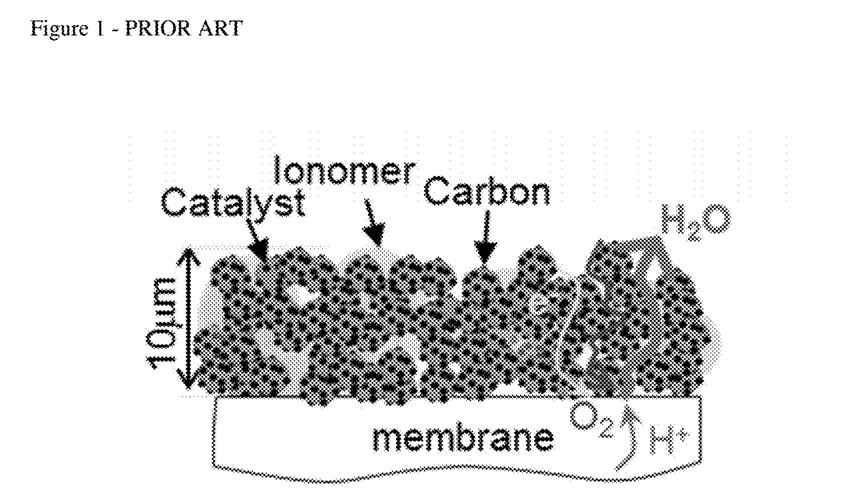
FIG. 1 is a schematic representation of a conventional catalyst layer, suitable for a polymer electrode membrane (PEM) fuel cell (FC) cathode.

A known format of a catalyst layer on a polymer electrolyte membrane (PEM) fuel cell cathode is shown in FIG. 1. The catalyst layer, shown here with a thickness of approximately 10 μm, contains platinum catalyst on a carbon support, intermixed with ionomer. Typical polymer electrolyte materials are perfluorosulfonic acid (PFSA) polymers, such as those commercially available under the trademarks Nafion®, Aquivion®, Flemion®.

The catalyst material, most typically Pt or Pt-alloy, notably in view of its stability in the very acidic conditions involved, promotes the oxygen reduction reaction by minimising the activation overpotential, facilitating the cathode reaction ½ $O_2$+2 $H^+$+4$e^-$→$H_2O$, but can also be used at the anode to facilitate $H_2$ oxidation, in the anode reaction: $H_2$→$H^+$+2$e^-$. Most preferably 2 to 5 nm diameter Pt or Pt alloy particles are used. The catalyst support provides an increased surface area to the Pt-based catalyst and should also provide electrical conductivity to transfer the electrons, a porous structure to enable gas diffusion and water transport, and stability in electrochemical conditions. The most common support materials are carbon-based, typically 30 to 100 nm average diameter activated carbon powder, such as commercially available Vulcan® or Ketjen® carbon materials. Usually the Pt catalyst is loaded at an amount of 10 to 60 weight percent with respect to the carbon support material.

A known method of preparing a Membrane Electrode Assembly by transferring a catalyst layer onto the polymer electrolyte membrane (so called "decal" process) is an "ink-based" process. It can be described as follows:
1) Preparation of the ink by mixing the supported catalyst (Pt/C), the ionomer (ion-conducting polymer) and an appropriate solvent;
2) Casting the ink on an intermediate hydrophobic substrate (such as PTFE-based membrane) that does not swell and that has a glass transition temperature higher than the polymer elelctrolyte membrane;
3) Drying at a temperature of less than 100° C. to eliminate the solvent, so that the catalyst layer is formed on the PTFE substrate;
4) "Decal" method: hot pressing of the PTFE substrate coated with a catalyst layer against the polymer electrolyte membrane (such as Nafion®); peeling off the PTFE substrate, so that the catalyst layer is transferred onto the polymer membrane forming a Membrane-Electrode-Assembly (MEA).

There are disadvantages associated with this conventional catalyst layer structure, and in particular:
a) Because of the ink-based manufacturing process it is impossible to control the structure at micro/nano level ensuring the highest efficiency in Pt utilisation (by forming a maximum number of "three-phase boundary" sites). During the manufacturing process carbon particles may agglomerate, the ionomer may not be finely dispersed and may completely cover Pt particles making them inaccessible for catalytic reactions;
b) Carbon is generally not stable. During operation of the fuel cell carbon corrodes, and the Pt agglomerates show reduced surface area. To increase stability, the carbon could be graphitized, however in this case surface area would be lost and performance reduced;
c) The ionomer itself may promote Pt dissolution leading to performance loss.

A structure for a fuel cell cathode catalyst layer not involving an "ink layer" is disclosed in U.S. Pat. No. 7,622,217. Here a nanostructured thin-film (NSTF) catalyst layer is disclosed wherein there is no carbon support, and no ionomer (ink layer). Organic crystalline whiskers act as a catalyst support, with a Pt-based catalyst loading, the catalyst comprising Pt in combination with other metals. An electrode layer of less than 1 μm thickness can be produced. However, the NSTF structure risks here being not mechanically robust, and the structure may not be retained during membrane electrode assembly (MEA) preparation and FC (fuel cell) operation. Through a loss of structure, disadvantages are to be expected, including both a loss in electrochemical surface area, with consequences on activation overpotential, as well as a loss of porosity with consequences for water-gas management and concentration overpotential.

In this context, it is desirable to develop new catalyst layers, which would be applicable in particular but not only in fuel cell applications, wherein one or more of the problems (a) to (c) listed above is minimized so that, as far as possible, a structure is provided having high catalytic activity and ability to support effective water and gas transfer, these properties being stable over the long-term use of the fuel cell.

Meanwhile, titania ($TiO_2$) nanotubes are known as materials and can be prepared inter alia by anodization of titanium metal films. For example, CN 101560669 describes a method for preparing $TiO_2$ nanotubes by anodization on a titanium metal substrate. A catalytic electrode is then prepared wherein a noble metal (such as Pt, Pd) is deposited on the nanotubes using pulse current combined with ultrasound.

WO 2010/080703 describes the preparation of nitrogen-doped titania nanotube arrays and their use in photocatalytic conversion of carbon dioxide into hydrocarbons in the presence of water vapour.

Titanium (di)oxide nanotubes (TNT) can also be prepared, apart from anodization techniques, by technologies involving treating titanium oxide with alkaline materials such as alkali metal hydroxides. Formation of a sol solution of titanium oxide in water, optionally with a lower alcohol cosolvent, can be carried out followed by treatment with a peroxide material such as hydrogen peroxide, followed by successive treatments with an alkali metal hydroxides and a cation source. Electrospinning can also be used to produce $TiO_2$ nanotubes, and also $TiO_2$ nanofibres, by using a core solution of a removable material such as mineral oil and a sheath solution of sheath material such as a titanium alkoxide (and other typical sol-gel precursor-type materials). The core solution of removable material and the sheath solution of sheath material are subjected to a high-voltage and forced through a spinneret. These various techniques for titania nanotube preparation are detailed in US 2010/0258446, which more specifically relates to catalytic materials having palladium dispersed on the nanotube surface, for use in photocatalytic conversion of carbon dioxide into reduced carbon compounds, such as methanol, in the presence of water vapour.

SUMMARY OF THE INVENTION

Through the experimental work of the present application, it has been found possible to transfer titanium (di)oxide structures, such as a titanium (di)oxide nanotube (TNT) array, onto a polymer electrolyte membrane support.

The vertically or substantially vertically aligned titania nanotube (TNT) arrays on polymer elelctrolyte membrane supports may be coated with noble metal alloys, such as platinum (Pt) or platinum alloy, which may be in the form of particles, which is of particular interest in applications such as fuel cell electrodes.

It is believed that the structures obtained, may provide increased electrochemical and structural stability e.g. in fuel cell electrode applications, as compared to systems based on fine carbon particle supports, whilst providing a high standard of mass transfer for reaction species involved in cathode, or anode, reactions. With a thickness typically equal to or less than 2 µm, it is believed that no ionomer is necessary to ensure ion transfer, and therefore the catalyst layer can be ionomer-free.

Figure 2:
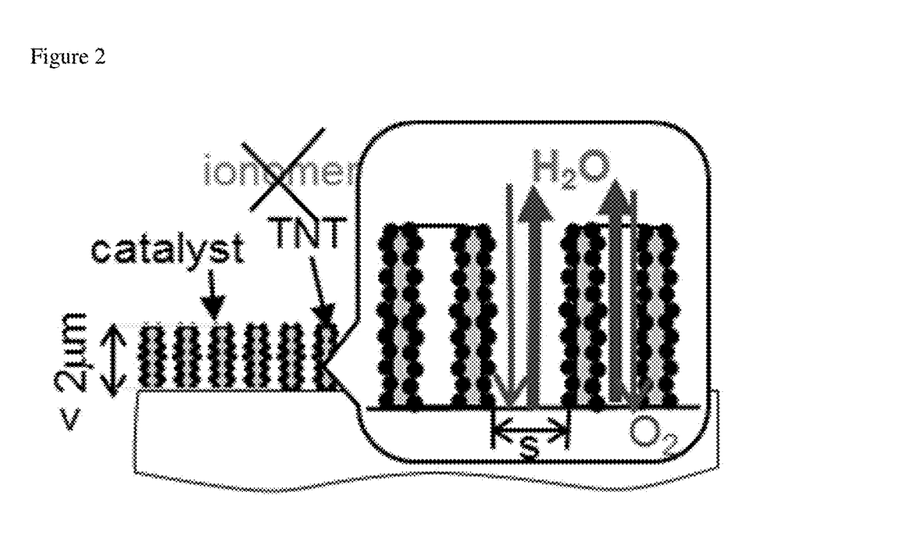
FIG. 2 shows a schematic view of one illustrative example of a Pt-coated titania nanotube (TNT) array on a polymer membrane support, an example of a structure according to the present invention.

FIG. 2 shows a schematic view of one illustrative example of a Pt-coated titania nanotube (TNT) array on a polymer membrane support according to the present invention. This illustrative embodiment shows vertically, or substantially vertically, aligned (titania) nanotubes on a polymer support, and in this specific non-limiting example, substantially no or no ionomer is present in the catalyst layer. It is in effect considered possible using the technology of the present invention to have a catalyst layer on a polymer membrane support, the membrane containing ionomer, wherein the thin but structurally stable catalyst layer does not need to contain dispersed ionomer.

Thus, in one aspect, the present invention relates to a structure comprising a layer comprising titanium (di)oxide nanostructures, in contact with a membrane layer comprising a proton-conducting polymer.

The Applicant has developed a method for using a hot press process to transfer titania nanostructures, such as a titania nanotube (TNT) array, onto a polymer membrane. Thus, in another aspect, the present invention relates to a process for the preparation of a structure of the invention, the process comprising the steps of:

(a) providing a first presentation of titanium (di)oxide nanostructures on a first substrate;

(b) bringing the summits of the nanostructures into contact with a ion-conducting polymer membrane, the summits of the nanostructures being at the other end of the nanostructures with respect to the bases of the nanostructures that are anchored on the surface of the first substrate;

(c) pressing the summits of the nanostructures into the surface of the polymer membrane using a hot press; and (d) detaching the nanostructures from the first substrate.

BRIEF SUMMARY OF THE FIGURES

FIG. 6 shows the top view of a polymer membrane assembly observed by SEM. In FIG. 6a it is possible to see the polymer membrane support on the right, and the electrode area on the left. The electrode area is constituted by TNT.

DETAILED DESCRIPTION OF THE INVENTION

A number of nanostructures, having at least one dimension less than 1 micron (1 µm=1000 nm), are known having geometrically regular structures. A number of nanostructures are considered to be "one-dimensional" in that they have a string-type shape with a string cross-section very much less than their length. Such "one-dimensional" nanostructures have been called by a variety of names including: (nano) whiskers, (nano)fibers or (nano)fibrils, nanowires and nanorods. In many cases, nanotubules and nanocables are also considered one-dimensional structures. The terms "(nano) whiskers" and "nanorods" are often used to describe shorter-length structures than "(nano)fibers" and "nanowires", although there is not an accepted standard distinction between the groups. In most instances, all of the dimensions of "nanorods" lie in the range of 1 nm to 100 nm. Typical aspect ratios (length divided by width) are from 3 to 5. Nanofibers are usually defined as fibers with diameters of less than 100 nm.

In the present invention, various types of titanium (di) oxide nanostructures can be used. In advantageous embodiments, nanofibres and nanorods can be used. Furthermore, in preferred embodiments, "nanotubes" can be used, these being structures which show an internal cavity.

In one preferred embodiment, anodization of a Ti film may be used to produce $TiO_2$ nanotube arrays. Anodization (anodic oxidation) is a known method for making titania nanotubes. In the presence of fluoride in the electrolyte, a tubular titania layer is formed instead of a compact oxide layer. The first generation of $TiO_2$ nanotube (TNT) arrays was grown in aqueous hydrofluoric acid (HF) electrolytes (as reported in Zwilling et al., Electrochim. Acta, 45 (1991), 921). However, with an essentially aqueous electrolyte, the nanotube layer is limited to 500-600 nm due to rapid chemical etching by HF, which dissolves most of the growing oxide preventing long tube formation. The rapid titania dissolution by HF is reduced by substitution with a less aggressive solution containing fluoride salts such as ammonium fluoride ($NH_4F$) and sodium fluoride (NaF). In a non-aqueous based electrolyte, formation of self-organized $TiO_2$ nanotubes with tube lengths greater than 2 μm can be achieved.

In the framework of the present invention, generally appropriate process conditions for preparing separated $TiO_2$ nanotubes by anodization involve placing a titanium metal film in an electrolyte bath containing a polar non-aqueous organic solvent, optionally containing a certain amount of added water. The Ti metal film usually has a thickness of less than 1 mm, and more than 5 μm, typically about 100 μm. The organic solvent may for example be a glycol, such as ethylene glycol, diethylene glycol (DEG) or polyethylene glycols, glycerol, or dimethyl sulfoxide (DMSO). It is also possible to add highly ionic conductive organics, such as ionic liquids i.e. 1-butyl-3-methylimidazolium tetrafluoroborate ($BMIM-BF_4$), as disclosed in Paramasivam et al., Electrochim. Acta, 2008, 54, 643.25. Water may be added, for instance in the amount of from 0 to 4% by mass in the total electrolyte bath. A fluoride source such as hydrogen fluoride may be used. Other possible fluoride sources include $NH_4F$, NaF, and ammonium tetrafluoroborate ($NH_4BF_4$). The fluoride source may appropriately be added in an amount of between 1 to 2% by mass in the total electrolyte bath. In exemplary and generally appropriate anodization conditions, the voltage is applied is between 20 V and 30 V. A generally appropriate duration of anodization is between 20 and 120 hours.

As well as nanotubes, anodization of Ti foil can be used to make nanorods (cf. Lin et al., Journal of The Electrochemical Society, 159 (1) K5-K9 (2012)), and nanofibres (cf. Beh et al., Applied Surface Science, vol. 257, no. 10, pp. 4706-4708, 2011).

A wide variety of further techniques have been employed to synthesize nanorods and nanofibres of titanium dioxide, such as vapor-liquid-solid (VLS) synthesis, metal organic chemical vapor deposition (MOCVD), laser-assisted catalytic growth, hydrothermal processes and template-assisted routes. The template-assisted routes offer different advantages over other techniques due to the production of 1D titanium dioxide with uniform diameter and desired length (Liu, Xia, Xue, & Lu, 2009). In this method, the template is dipped directly into the precursor solution for the appropriate period of time. The precursor solution can be prepared by the sol-gel process.

Figure 4:
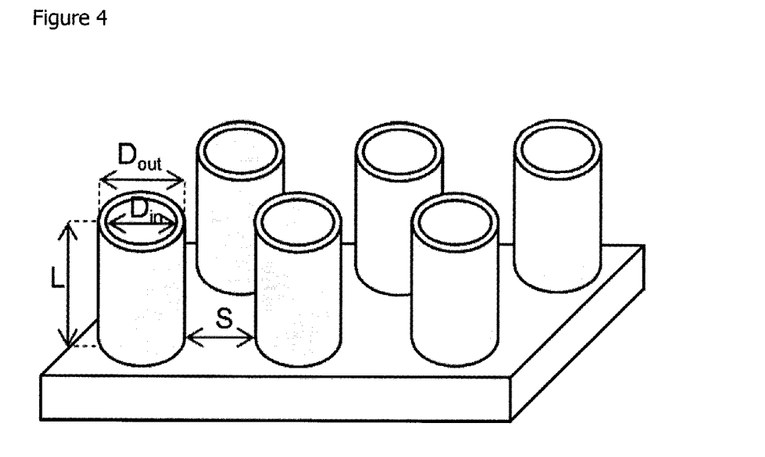
FIG. 4 is a schematic diagram showing geometrical attributes of nanotubes and arrays thereof and how distances characterizing such nanotubes and nanotube arrays are to be understood in the framework of the present invention.
Figure 5:
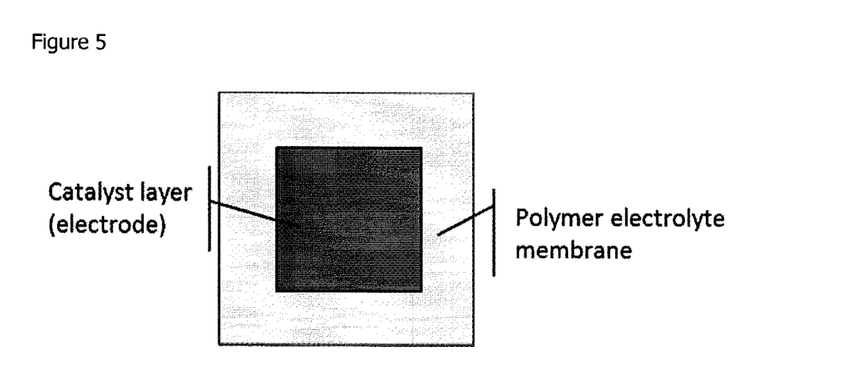
FIG. 5 shows a general schematic of a Membrane-Electrode-Assembly. The electrode is depicted in the centre.
Figure 6A:
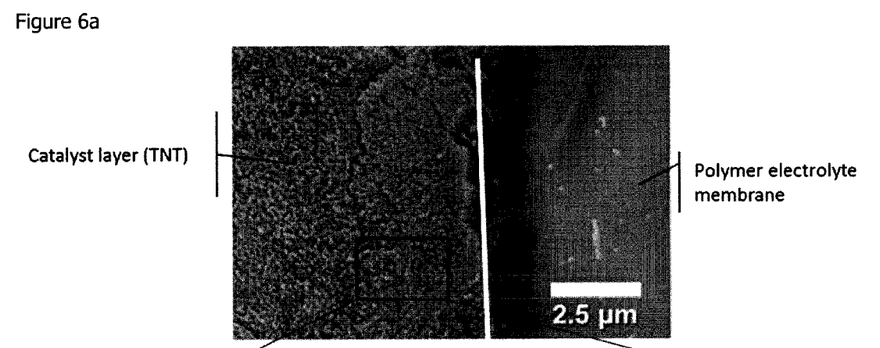
Figure 6B:
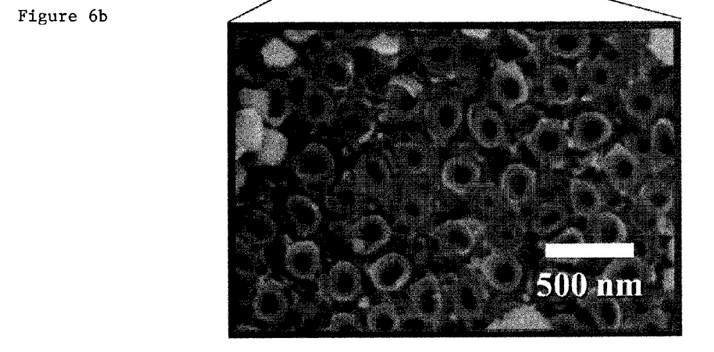
FIG. 6b is a magnification of the electrode portion of FIG. 6a. One can see the open end of the TNTs.
Figure 7:
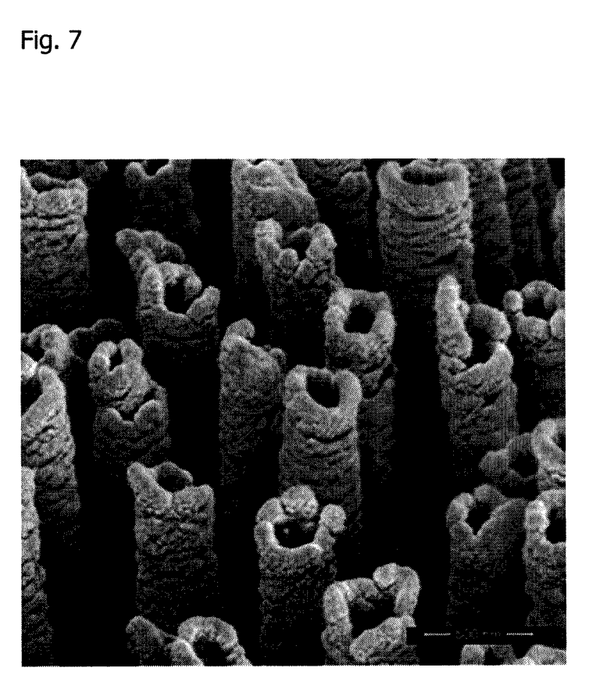
FIG. 7 shows a side view of Pt-coated TNTs.

FIG. 4 is a schematic diagram showing geometrical attributes of nanotubes and nanotube arrays and how distances of and between nanotubes are to be understood in the framework of the present invention. Nanotube geometry can be studied by scanning electron microscopy (SEM). By carrying out statistical sampling of a number of nanotubes in arrays, both their internal dimensions and inter-tube spacings can be calculated, and thence average (mean) values for the distances between outer walls of nanotubes (average S in FIG. 4), and average (mean) values for the overall outer diameter of nanotubes (average $D_{out}$ in FIG. 4), or inner diameter (average $D_{in}$ in FIG. 4).

The spacing between nanotubes is believed to be a significant factor in fuel cell applications because it is important to ensure not only high surface area, which would be favoured by narrow spacing and long nanotubes, but also water/gas management. It is hypothesised that an inter-nanotube spacing of, on average, 80 to 200 nanometres (nm) would be an appropriate compromise value to provide high surface area for catalysis and also easy mass transport.

The internal diameter of nanotubes is also believed to be a relevant factor in catalytic applications such as fuel cell applications because the catalyst can also be deposited inside the nanotubes, providing a larger electrochemical surface area. It is currently envisaged that an internal diameter (from the inside wall of a nanotube through to the opposite inside wall going through the geometrical centre of a circular or substantially circular planar cross-section) should appropriately in the range 80 to 200 nm to enable the deposition of Pt particles while still providing good properties of mass transfer (gas/water).

Thus, in preferred embodiments of the structures of the invention wherein the nanostructures are nanotubes, a preferred mean distance measured between the outside faces of adjacent nanotubes is between 50 nm and 400 nm, more preferably between 60 and 200 nm, and still more preferably between 80 and 150 nm. A preferred mean inner diameter of nanotubes is between 80 nm and 400 nm, and a preferred mean outer diameter of nanotubes is between 100 nm and 500 nm. In preferred embodiments of the structures of the invention wherein the nanostructures are nanotubes, a preferred mean length of nanotubes is less than 2.0 μm, and is more preferably between 0.5 μm and 1.5 μm.

In preferred embodiments of the structures of the invention wherein the nanostructures are nanotubes, the layer comprising titanium (di)oxide nanostructures contains an array of titanium (di)oxide nanotubes (TNT), wherein the mean angle of elevation of the longitudinal direction of the nanotubes with respect to the plane of the membrane layer is at least 30°, preferably at least 70°, and most preferably the nanotubes are vertically or substantially vertically aligned on the membrane (angle of elevation about 90°), so that the main axis of the cylinders constituting nanotubes is perpendicular to the membrane surface.

In a preferred embodiment, after anodization, a TNT array prepared in the present invention on a first substrate such as a Ti metal film, is subjected to an annealing process to crystallise $TiO_2$ involving heating at a temperature of 300° C. to 1000° C., preferably for a period of time of 30 min to 4 hours. In an exemplary, illustrative and non-limiting embodiment, heating at 350° C. in air for 1 hour can be used for the annealing process of the TNT array layer leading to the anatase crystalline phase formation. The relevance of the annealing step is that TNT grown by anodization are amorphous. Amorphous TNT are not stable in acidic conditions and therefore it is preferable to crystallize TNT by annealing. Any crystalline form provides stability, but the low temperature crystalline phase is anatase.

Annealing may also be used to stabilize other non-crystalline $TiO_2$ nanostructures of the present invention, such as nanorods and nanofibres.

In the structures of the present invention, a layer of titanium (di)oxide nanostructures is applied to a membrane layer comprising a proton-conducting polymer. The proton-conducting polymer (an "ionomer") may be a sulfonated polymer, polyimide, polyvinylidene fluoride, polybenzimidazole, polysulfone, polyethersulfone, polyetherketone, polyphenylenesulfide, polyphenyleneoxide, polyphosphazene, polyethylenenaphthalate, polyamide, or polyester.

The proton-conducting polymers used in structures of the present invention will typically show anionic groups bound to a common backbone. The anionic groups of most importance are sulfonic acid groups but anionic groups may also include carboxylic acid groups, imide groups and amide groups. The proton-conducting polymers used in structures of the present invention are appropriately fluorinated, containing carbon-fluorine atoms in their main chains and/or side chains. Thus, in generally appropriate embodiments of the invention, the proton-conducting polymer membrane of structures of the invention, bearing a layer of nanostructures, is a polymer membrane containing a polymer that contains a partially or fully fluorinated main chain and partially or fully fluorinated side chains containing anionic groups. Preferred polymers for use in the present invention are typically highly fluorinated and most typically perfluorinated. Examples include copolymers of tetrafluoroethylene and one or more fluorinated, acid-functional comonomers. Copolymers having sulfonate group-terminated perfluorovinyl ether groups attached to a poly(tetrafluoroethylene) backbone, such as those commonly referred to as Nafion®, can be used in preferred embodiments of the present invention. In highly preferred embodiments of the invention, the proton-conducting polymer membrane thus contains tetrafluoroethylene-derived units and sulfonate group-terminated perfluorovinyl ether groups. The perfluorinated backbone of Nafion® provides significant mechanical strength and hydrophobicity, and the sulfonic acid group is an exceptional ion-conducting moiety. As well as Nafion® (DuPont), Flemion® (Asahi Glass) is another well-known polymer of this type that can be used in the present invention. The equivalent weight (EW), i.e. the weight of polymer such as Nafion (in molecular mass) per mole of sulfonic acid group, will commonly be 1200 or less, more typically 1100 or less, more typically 1000 or less, and may be 900 or less, or 800 or less. The polymer can be formed into a membrane by any suitable method. The polymer is typically cast from a suspension. Any suitable casting method may be used, including bar coating, spray coating, slit coating, brush coating, and the like. Alternately, the membrane may be formed from neat polymer in a melt process such as extrusion. After forming, the membrane may be annealed, typically at a temperature of 120° C. or higher, typically 150° C. or higher.

In structures of the present invention, the proton-conducting polymer membrane appropriately has a thickness of at least 10 microns (μm) and at most 200 microns (μm), preferably at least 20 and at most 50 microns. Thinner membranes are better for proton transfer resistance but are difficult to manufacture and handle. A generally appropriate range of thickness for the proton-conducting polymer membrane will thus be 20 to 50 microns.

Proton-conducting polymers of the invention may be incorporated in the structures of the invention in acid or salt form, or at any degree of neutralization between fully protonated and fully deprotonated forms.

Figure 3:
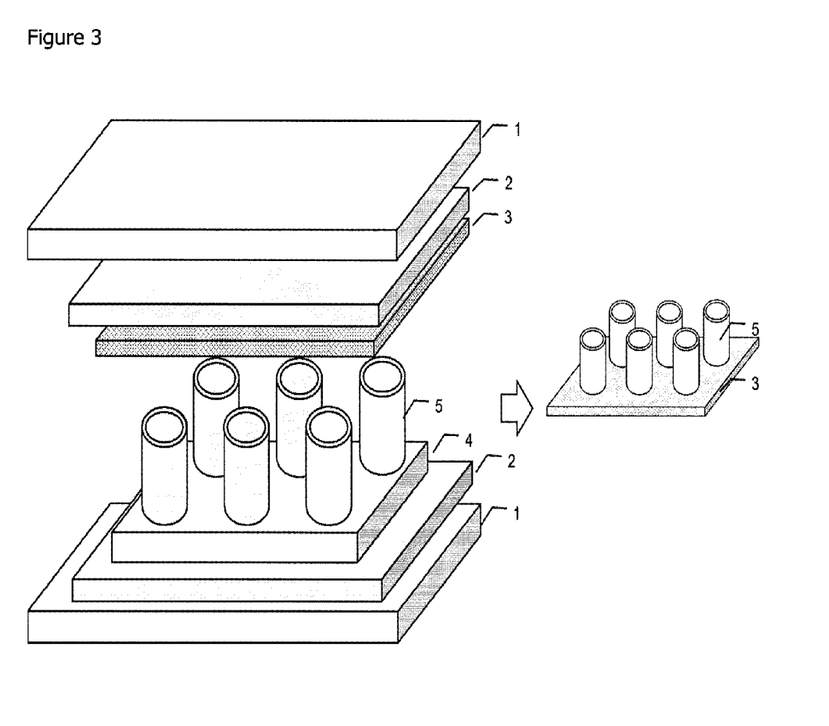
FIG. 3 shows a schematic diagram of one preferred embodiment of a hot press system for transferring a titania nanostructure presentation, here a nanotube (TNT) array, onto a polymer membrane.

FIG. 3 shows a schematic diagram of a preferred embodiment of a hot press system for transferring a titania nanotube (TNT) array to a polymer membrane. In the illustrated preferred embodiment, reference numeral (1) refers to the metal plates of the hot press. Reference numeral (2) refers to protective films used to avoid sticking of the first substrate and/or the polymer membrane to the metal plates. For example, a highly heat-stable polymer films such as polyimide can be used for protective films (2). An example is the polyimide Kapton® sold by DuPont. A silicone-coated polypropylene release liner can also be used as described in WO 02/061871. Entity (4) is the TNT array (5) on the first substrate, such as a titanium (Ti) film, an example of the more general process intermediate of the present invention consisting of titanium (di)oxide nanostructures on a first substrate surface. In the final entity, the TNT array has been transferred to the polymer membrane, which is represented separately as sheet (3) on the left-hand side of the schematic diagram.

In an exemplary illustrative and non-limiting embodiment, transfer to a polymer membrane, such as for example an ionomer membrane of the Nafion® or related type, is carried out in a hot press as a temperature of 110° C. and at a pressure of 100 bar. Under such conditions it has been found possible to successfully transfer a TNT array to a Nafion® membrane. After processing in the hot press in experiments using a titanium metal foil first substrate (on which titania nanotubes had been grown by anodization), it was found possible to detach the Naflon® membrane bearing a TNT array by simple manual detachment.

Concerning generally appropriate temperatures for hot press transfer, this will depend on the glass transition temperature of the polymer membrane. For perfluorinated sulfonic acid-based membranes (PFSA type), 130° C. is an appropriate maximum temperature, but for polymer membranes with a higher hydrocarbon content, a higher temperature could be used. In typically appropriate process embodiments in the framework of the present invention, for transferring nanostructures from a first substrate to a ion-conducting polymer membrane, a pressure within the range of 10 bar to 200 bar may be appropriately used, with a temperature within the range of 50° C. to 130° C.

In the case of titanium (di)oxide nanotubes grown on a Ti film as first substrate, prior to anodization, titanium foils may be advantageously pretreated in one or more of the four following ways:

a) Grinding;
b) Polishing;
c) Chemical etching solution 1 (CES-1) based on nitric acid and hydrofluoric acid. In a typical embodiment, CES-1 contains 5 M $HNO_3$ and 40 g/L HF for 3 minutes of full immersion;
d) Chemical etching solution 2 (CES-2) based on sulphuric acid and hydrogen peroxide. In a typical embodiment, CES-2 contains $H_2O+H_2SO_4$ (95%)+$H_2O_2$ (30%) at a volumetric ratio of 1:2:2 for around 15 minutes of full immersion.

Generally appropriate Ti foils used in anodization experiments will have a thickness of less than 1 millimeter, for example 0.10 mm. In a typical embodiment, small sections of Ti foil a few square centimetres are used in anodization. Platinum (Pt) wire may appropriately be used as a counter electrode.

Alternative methods to grow TNTs (step 1), apart from anodization, include a sol-gel template synthesis of ordered $TiO_2$ nanotubes of uniform diameter using alumina porous membrane (anodic aluminium oxide, MO) as a template. There are many MO commercially available, with a defined pore size and thickness. The alumina template membrane is dipped into a solution of the titanium oxide precursor(s) and then dried. The template is finally removed by chemical etching. As a synthesis method from the literature, one may cite Maiyalagan et al., Bull. Mater. Sci., Vol. 29, No. 7, December 2006, pp. 705-708, wherein titanium isopropoxide (5 ml) was added to 25 ml of 2-propanol. The solution was stirred for 3 h at room temperature (298 K). The alumina template membrane was dipped into this solution for 2 min. After removal from the solution, vacuum was applied to the bottom of the membrane until the entire volume of the solution was pulled through the membrane. The membrane was then air-dried for 60 min at 303 K and then annealed to 873 K for 2 h. The ordered $TiO_2$ nanotube arrays were obtained by dissolving the alumina template in 3 M aqueous NaOH for several minutes. $TiO_2$ nanotubes thus formed were then washed several times with distilled water to remove the dissolved anodic alumina membrane and remaining NaOH solution.

Where alumina is used as a porous template, once the TNT have been crystallised within the MO porous template, this composite layer may be hot pressed with/to the polymer electrolyte membrane (the AAO/TNT layer is sandwiched between the polymer electrolyte membrane and the high temperature resistant polymer film (i.e. Kapton®). Finally, chemical etching may be used to selectively dissolve the MO template (not the polymer membrane). For a PFSA (perfluoro-sulfonic acid)-type polymer membranes such as Nafion® and analogous materials, a suitable acid would be $H_2SO_4$, which does not damage the polymer membrane. No peel-off step is required in such an embodiment.

For catalytic applications including fuel cell applications, it is envisaged that platinum or platinum alloy materials, or other noble metals or their alloys, may be deposited on the surface of the titanium (di)oxide nanostructures e.g. nanotubes. Noble metals other than Pt include ruthenium, osmium, rhodium, iridium, palladium, gold and silver. In this context, both the inner surface of nanotubes and the outer surface may support deposited noble metal/noble metal alloys such as platinum or platinum alloy.

In generally preferable noble metal-coated structures of the invention, appropriate weight ranges of noble metal (such as Pt) to titania nanostructures (such as titania nanotubes TNT) will be (weight/weight) comprised between 1% and 100%, preferably between 5% and 40%. Therefore, the amount of Pt as a weight percentage of TNT in preferred embodiments will be at least 5% and at most 40%. In many practical electrode applications, such as applications in fuel cells, the amount of noble metal, such as Pt, will in fact more commonly be determined by one skilled in the art with respect to the geometric area of the electrode in the final electrode assembly. A generally appropriate range of noble metal, such as Pt, will thus be at least 0.01 and at most 1 mg/cm$^2$ of geometric area of the electrode, and preferably at least 0.01 and at most 0.2 mg/cm$^2$.

Different methods can be used for depositing noble metal based catalysts on surfaces, including physical deposition methods (such as PVD (Physical Vapour Deposition), or sputtering) and chemical deposition methods (sol-gel methods, or atomic layer deposition.

The term "physical vapor deposition (PVD)" covers a variety of vacuum deposition methods used to deposit thin films by the condensation of a vaporized form of the desired film material onto various types of surface.

The coating method involves purely physical processes such as high temperature vacuum evaporation with subsequent condensation, or plasma sputter bombardment rather than involving a chemical reaction at the surface to be coated as in chemical vapor deposition.

Variants of PVD include:

Cathodic Arc Deposition: Here, a high power electric arc discharged at a target (source) material removes some of this material on its outer surface, creating highly ionized vapor to be later deposited on the substrate to be coated.

Electron beam physical vapor deposition. Here, the material to be deposited is heated to a high vapor pressure by electron bombardment in a high vacuum and is transported by diffusion to be deposited by condensation on the (cooler) surface to be coated.

Evaporative deposition. Here, the material to be deposited is heated to a high vapor pressure by electrically resistive heating in a low vacuum.

Pulsed laser deposition. Here, a high power laser ablates material from the target (source material), producing a vapor.

Sputter deposition. Here, a glow plasma discharge (usually localized around the target by a magnet) bombards the material sputtering some away as a vapor for subsequent deposition on the surface to be coated.

Sputter deposition of Pt has been explored by various researchers as a potential path for manufacturing ultralow Pt loading electrodes in a controlled process. Pt has been sputtered onto the gas diffusion layer GDL, the membrane or deposited onto polytetrafluoroethylene, PTFE sheets or similar support substrates and subsequently transferred to the membrane. Pt can be sputtered onto $TiO_2$ nanotubes using RF or a DC magnetron device.

Chemical deposition methods useful for applying noble gas coatings to surfaces in the present invention can be classified into two main groups: the first group comprising Chemical Vapor Deposition (CVD) and Atomic Layer Deposition (ALD) uses a gas phase to transport volatile molecules to the surface serving as a substrate, and the second group of deposition techniques, called Chemical Solution Deposition or Sol-Gel Processing, uses a liquid phase as the mass transfer media.

Atomic layer deposition (ALD) is a thin film deposition technique that is based on the sequential use of a gas phase chemical process. The majority of ALD reactions use two chemicals, typically called precursors. These precursors react with a surface one at a time in a sequential, self-limiting, manner. By exposing the precursors to the growth surface repeatedly, a thin film is deposited, as shown for example in U.S. Pat. No. 4,389,973.

Pt can be deposited on $TiO_2$ nanotubes by ALD. ALD of platinum thin films has notably been studied with two different platinum precursors: MeCpPtMe$_3$ (Me=methyl) (cf. Lashdaf et al., Appl. Catal. A, 276 (2004) 129-137) and Pt(acac)$_2$ (acac=acetylacetonato).

In the framework of the present invention, a noble metal may be used as an alloy with one or more other noble metals and/or one or transition metals. Examples of transition metals include molybdenum, cobalt, iron, nickel, titanium, tungsten, rhenium, chromium, manganese, niobium and tantalum.

In an exemplary series of process steps according to the present invention including coating of structures using a noble metal, Pt or another noble metal or alloy thereof is coated on the first substrate bearing titania nanostructures, after optional annealing, but before transfer to the ion-conducting polymer membrane. The noble metal may also be applied after the decal step, i.e. after transfer of the titania nanostructures, such as titania nanotubes, to the ion-conducting polymer membrane. However, loading with platinum prior to transfer to the ion-conducting polymer membrane may well be preferable, because noble metal deposition techniques may damage the polymer electrolyte membrane surface, for example, by ion/electron/particle impacts during sputtering, or by membrane shrinkage after techniques involving contact with a solvent and subsequent drying. In addition, in the case of nanotube arrays having an inner surface (inside the nanotubes) and an outer surface, during growth on a first substrate such as titanium foil, the nanotubes have an open top, like a growing chimney, and therefore they are open to coating on both the inside and the outside. However, after transfer to the ion-conducting polymer membrane, the previously open summits of the nanotube array are expected to become the bases of the new structure produced, i.e. the summits are expected to be embedded "head first" in the polymer membrane surface, and the inside surface may then be less accessible to noble metal than was the case on the initial substrate.

The technical teaching of all patent and non-patent references cited hereinabove are incorporated herein in their entirety.

All combinations of embodiments of products or processes of the present invention, taught herein as being preferable, advantageous or otherwise generally applicable within the framework of the present invention, are to be interpreted as being within the scope of the present invention, except where such combinations of preferred features, disclosed in separate parts of the text hereinabove, are said therein to be mutually exclusive or are clearly contradictory/technically incompatible in context.

Worked examples provided in what follows illustrate specific embodiments of the present invention but are not to be interpreted as defining or limiting the scope thereof.

EXAMPLE

In a worked example, anodic oxidation of titanium was carried out in an electrochemical cell to grow aligned $TiO_2$ nanotubes.

Thus, a titanium foil of 0.1 mm thickness with a surface area 18×18 mm (99.6% purity, Advent.) was cleaned with ethanol and used as anode (working electrode). A Pt mesh was used as counter-electrode. The two electrodes were placed parallel to each other with a distance of about 2 cm. The anodization experiment was conducted at a constant potential of 30 V for 20 hours using a DC power supply (Jaissle IMP PC-200V). The experiment was carried out at room temperature using a DMSO electrolyte with 6 wt % HF (40% aqueous solution, Merck KGaA).

The as-anodized sample was rinsed thoroughly with deionized water and then dried in air. Thermal annealing was performed on the anodized samples at 350° C. for 1 h to convert the amorphous oxide tubes to the crystalline anatase phase. Here, in addition, the as-annealed sample was decorated with Pt particles using ALD technology.

A Nafion® 212 polymer membrane (DuPont) was used to fabricate the membrane electrode assembly. Before being applied to the electrodes, the membrane was pretreated in four steps to remove the organic and inorganic contaminants. First, the Nafion® membrane was boiled in 3 wt % $H_2O_2$ solution followed by washing in a ultra-pure water. Then, the membrane was boiled in 0.5 mol/L $H_2SO_4$ solution. Finally, the membrane was boiled again in the ultra-pure water. Each step took about 1 h.

The cathode coated-membrane was assembled by hot pressing the catalyst coated TNT/Ti foil onto the pretreated Nafion® membrane. The hot pressing was performed at a temperature of 110° C. and at a pressure of 100 bar, for 5 min.

The invention claimed is:

1. A structure comprising:
 a membrane layer comprising a proton-conducting polymer; and
 a catalyst layer that is in contact with a surface of the membrane layer, the catalyst layer comprising an array of titanium (di)oxide nanotubes that are coated with a noble metal or noble metal alloy,
 wherein the nanotubes are substantially vertically aligned with respect to the surface of the membrane layer so that a mean angle of elevation of the longitudinal axis of the nanotubes with respect to the surface of the membrane layer is at least 70°.

2. The structure according to claim 1, wherein the mean distance measured between the outside faces of adjacent nanotubes is between 50 nm and 400 nm.

3. The structure according to claim 1, wherein the mean inner diameter of the nanotubes is between 80 nm and 400 nm, and the mean outer diameter of the nanotubes is between 100 nm and 500 nm.

4. The structure according to claim 1, wherein the mean length of the nanotubes is less than 2.0 µm.

5. The structure according to claim 1, wherein the membrane layer contains at least one polymer having a partially or fully fluorinated main chain and partially or fully fluorinated side chains containing anionic groups.

6. The structure according to claim 5, wherein the membrane layer contains tetrafluoroethylene-derived units and sulfonate group-terminated perfluorovinyl ether groups.

7. The structure according to claim 1, wherein the membrane layer has a thickness of 10 microns (µm) to 200 microns (µm).

8. The structure according to claim 1, wherein both inner and outer surfaces of the nanotubes are coated with the noble metal or noble metal alloy.

9. The structure according to claim 1, wherein:
 the catalyst layer is parallel to the membrane layer, extends to an end of the nanotubes opposite the membrane layer, and contains no ionomer, and
 the mean length of the nanotubes is equal to or less than 2.0 µm.

10. A process for preparation of the structure according to claim 1, the process comprising the steps of:
 (a) providing a first substrate having an array of titanium (di)oxide nanotubes anchored thereon;
 (b) bringing the summits of the nanotubes into contact with the surface of the membrane layer, the summits of the nanotubes being at the other end of the nanotubes with respect to the bases of the nanotubes that are anchored on the first substrate;
 (c) pressing the summits of the nanotubes into the surface of the membrane layer using a hot press so that the nanotubes are substantially vertically aligned with respect to the surface of the membrane layer, a mean angle of elevation of the longitudinal axis of the nanotubes with respect to the surface of the membrane layer being at least 70°; and
 (d) detaching the nanotubes from the first substrate, and further comprising, either before step (b) or after step (c), coating the nanotubes with the noble metal or noble metal alloy.

11. The process according to claim 10, wherein the first substrate is a titanium metal/titanium foil substrate.

12. The process according to claim 10, wherein in step (c), the pressure is within the range of 10 bar to 200 bar, and the temperature is within the range of 50° C. to 130° C.

13. A fuel cell comprising:
 the structure according to claim 1.

* * * * *